(12) United States Patent
Solis

(10) Patent No.: US 10,136,633 B2
(45) Date of Patent: Nov. 27, 2018

(54) SOLO HUNTER SYSTEM

(71) Applicant: Enrique Solis, Lafayette, AL (US)

(72) Inventor: Enrique Solis, Lafayette, AL (US)

( * ) Notice: Subject to any disclaimer, the term of this patent is extended or adjusted under 35 U.S.C. 154(b) by 0 days.

(21) Appl. No.: 15/799,124

(22) Filed: Oct. 31, 2017

(65) Prior Publication Data

US 2018/0255763 A1    Sep. 13, 2018

Related U.S. Application Data

(60) Provisional application No. 62/470,135, filed on Mar. 10, 2017.

(51) Int. Cl.
*A01M 31/00*   (2006.01)
*F16B 45/00*   (2006.01)
*F16B 13/00*   (2006.01)

(52) U.S. Cl.
CPC ............ *A01M 31/00* (2013.01); *F16B 13/00* (2013.01); *F16B 45/00* (2013.01)

(58) Field of Classification Search
CPC .... A01M 31/00; A01M 31/006; F16M 13/00; F16M 13/08; F16B 45/00; G09F 2007/1804; B66D 3/04; A22B 5/06; A22C 25/00
USPC ............ 248/317, 216.1, 216.4, 217.3, 217.4, 248/218.4, 684, 332; 452/192, 187
See application file for complete search history.

(56) References Cited

U.S. PATENT DOCUMENTS

| 543,121 | A | * | 7/1895 | Bates ................. A47G 25/0607 182/92 |
| 3,380,697 | A | * | 4/1968 | Melcher .................... E06O 9/04 182/92 |
| 3,854,168 | A | | 12/1974 | Bradley |
| 4,413,706 | A | * | 11/1983 | Michael ................. A63B 27/00 182/91 |
| 4,697,669 | A | * | 10/1987 | Bergsten ................... E06O 9/04 182/189 |
| 5,908,084 | A | | 6/1999 | Laurin et al. |
| 6,726,162 | B1 | * | 4/2004 | Winter .................. A01M 31/00 248/218.4 |
| 7,913,980 | B1 | | 3/2011 | Cipriano |
| 8,371,558 | B2 | | 2/2013 | Engleman et al. |
| 9,162,854 | B1 | * | 10/2015 | Ridgeway ............. A01M 31/02 |
| 2005/0247525 | A1 | | 11/2005 | Thornton |
| 2007/0138359 | A1 | * | 6/2007 | Johnson ............. A01M 31/006 248/218.4 |
| 2007/0205344 | A1 | | 9/2007 | Liermann et al. |

* cited by examiner

*Primary Examiner* — Anita M King
(74) *Attorney, Agent, or Firm* — Integrity Patent Group, PLC; Charles E. Runyan

(57) ABSTRACT

A right angle support member configured to be affixable to a vertical-object; the right angle support member configured to form a substantially L-shape having a vertical angle member having a first end; a horizontal angle member having a second end configured to extend outwardly away from a right angle vertex; and a threaded anchor hingebly coupled to the right angle vertex configured to be affixable to the vertical-object; a stabilizing spike located at the first end of the vertical angle member extending opposite of the horizontal angle member; a hanger loop proximate the second end of the horizontal angle member, the hanger loop is configured to receive and interact with a pulley system.

20 Claims, 5 Drawing Sheets

SOLO HUNTER SYSTEM

CROSS REFERENCE TO RELATED APPLICATION

The present application is related to and claims priority to U.S. Provisional Patent Application No. 62/470,135 filed Mar. 10, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of supports and more specifically relates to a lifting support.

2. Description of Related Art

Lifting a fallen game animal during a successful hunt is an extremely difficult endeavor, even for two or more people. It is desirable among hunters that they have a convenient and portable hanging apparatus for vertically hanging game that has been killed, so that the game can be more easily skinned, dressed, or moved without the hunter lifting the animal without assistance. Previously, hunters had to search out two trees spaced closely together to tie a rope in between and physically lift the animal. This has been unsatisfactory for a number of reasons. There have also been provided in the prior art, more complicated devices that include winches or other moving parts. These are difficult to transport and set up in the woods. And, a one pulley winch system is not the most efficient way for one person to lift a heavy animal. Other prior art uses jaws or clamps that can damage a tree. What is desired is a simple, convenient, tree friendly, and portable way for a hunter to lift game so that it can be easily skinned, dressed and moved.

U.S. Pat. No. 5,908,084 to Arthur E. Laurin, and Walter W. MacDonald relates to a lifting and raising device. The described lifting and raising device comprises a shank member and an elevating device. The shank member has a first leg with a threaded portion for threaded attachment to a tree or similar structure; a second leg attached to the first leg substantially normal thereto; and a third leg attached to the second leg substantially normal thereto at the end of the second leg opposite the first leg. The elevating device is secured to the third leg. The elevating device comprises a pulley secured to the shank, around which a rope or similar device may be passed to raise a tree blind or other load up a tree or similar structure by pulling.

BRIEF SUMMARY OF THE INVENTION

In view of the foregoing disadvantages inherent in the known support art, the present disclosure provides a novel solo hunter system. The general purpose of the present disclosure, which will be described subsequently in greater detail, is to provide a solo hunter system; the system comprising a right angle support member configured to be affixable to a vertical-object; the right angle support member configured to form a substantially L-shape having a vertical angle member having a first end; a horizontal angle member having a second end configured to extend outwardly away from a right angle vertex; and a threaded anchor hingebly coupled to the right angle vertex configured to be affixable to the vertical-object. A stabilizing spike is preferably located at the first end of the vertical angle member extending opposite of the horizontal angle member; a hanger loop proximate the second end of the horizontal angle member. The hanger loop is configured to receive and interact with a pulley system.

The right angle support member may be configured to be affixable to the vertical-object by screw-fastening the threaded anchor into the vertical-object and the vertical angle member being positioned against and substantially parallel to the vertical-object such that the stabilizing spike impales the vertical-object at a point vertically below the threaded anchor with the horizontal angle member extending outwardly from the vertical-object to support the hanger loop at a distance away from the vertical-object to receive the pulley system in functional combination to thus provide an elevated lifting system.

A method of using solo hunter system is also disclosed herein. The method of using the solo hunter system may comprise the steps of: providing a right angle support member, affixing the right angle support member, coupling the pulley system for elevating liftable-objects; wherein the liftable-objects comprises game and alternately hunting accessories desired to be lifted and lowered in relation to the vertical-object from a ground surface.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a solo hunter system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a support and more particularly to a solo hunter system, as used to improve the lifting and support of objects during hunting excursions.

Generally speaking, every hunter has experienced trying to lift and load a harvested deer alone; this can be daunting task. The Solo Hunter is an L bracket designed to help lift a harvested animal such a deer and load the animal onto a four wheeler or the like. This L bracket is easily installed on a tree trunk. The type of material used to manufacture the device and size may vary depending on actual use and species of game being harvested. Typically the way it used is to drag a fallen deer (or other game) to the base of the tree trunk, tie all four legs with a rope, drive the four-wheeler (or other vehicle) close to the tree trunk leaving enough space for the deer to be lifted, climb on the four wheeler front rack to attached the L Bracket to the tree trunk (a portable wheel-pulley hooks onto the end of the "L" bracket). Then the winch cable us 'ran' thru the wheel-pulley and hooked to the rope on the deer's legs. Next is to lift the animal higher than the four wheeler front rack, move the four-wheeler under the deer and lower the deer to the front rack. Accordingly an animal weighting 90 to 195 pounds may be lifted by this "L" bracket that easily attaches to a tree with a trunk 7 inches or bigger.

Figure 1:
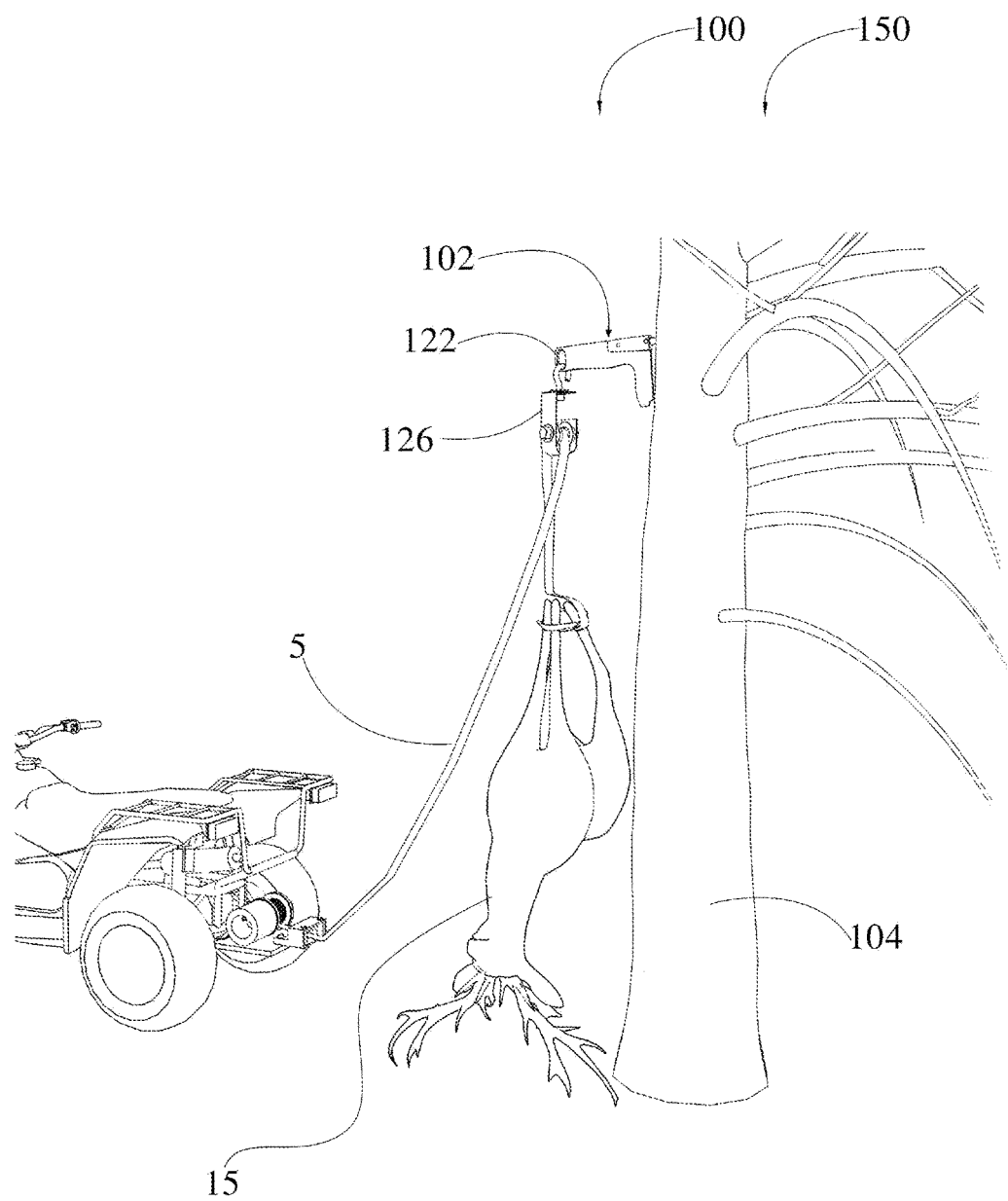
FIG. 1 is an in-use view of the solo hunter system during an 'in-use' condition, according to an embodiment of the disclosure.

Referring now more specifically to the drawings by numerals of reference, there is shown in FIGS. 1-4, various views of a solo hunter system 100. FIG. 1 shows a solo hunter system 100 during an 'in-use' condition 150, according to an embodiment of the present disclosure. As Illustrated, the solo hunter system 100 may include a right angle support member 102 configured to be affixable to a vertical-object 104 (such as a tree), so that the right angle support member 102 rests against the tree. The present invention is configured to form a substantially L-shape including a vertical angle member 108 having a first end 106 and a horizontal angle member 110 having a second end 112 (configured to extend outwardly away from a right angle vertex 114 and the tree). Additionally a threaded anchor 116 hingebly coupled to the right angle vertex 114 may be configured to be affixable to the vertical-object 104 for example a tree or wooden pole such as a phone/power pole or the like. It should be noted that vehicle-mount of the winch used may be to the back (shown) or the front.

A stabilizing spike 118 located at the first end 106 of the vertical angle member 108 extending opposite of the horizontal angle member 110 is configured to impale into the vertical-object 104 as a secondary anchor to aid in stabilizing the right angle support 102. Further referring to FIG. 1, right angle support 102 may include a hanger loop 122 proximate the second end 112 of the horizontal angle member 110; the hanger loop 122 may be configured to receive and interact with a pulley 10 system as illustrated in more detail in FIG. 3.

The right angle support member 102 as shown in FIG. 1 may be configured to be affixable to the vertical-object 104 by screw-fastening the threaded anchor 116 into the vertical-object 104 such that the vertical angle member 108 may be positioned against and substantially parallel to the vertical-object 104. As such the stabilizing spike 118 impales the vertical-object 104 at a point vertically below the threaded anchor 116 as clearly shown in FIG. 3, with the horizontal angle member 110 extending outwardly from the vertical-object 104 to support the hanger loop 122 at a distance away from the vertical-object 104 to receive the pulley 10 system in functional combination to thus provide an elevated lifting system for fallen game 15 as shown.

Figure 2:
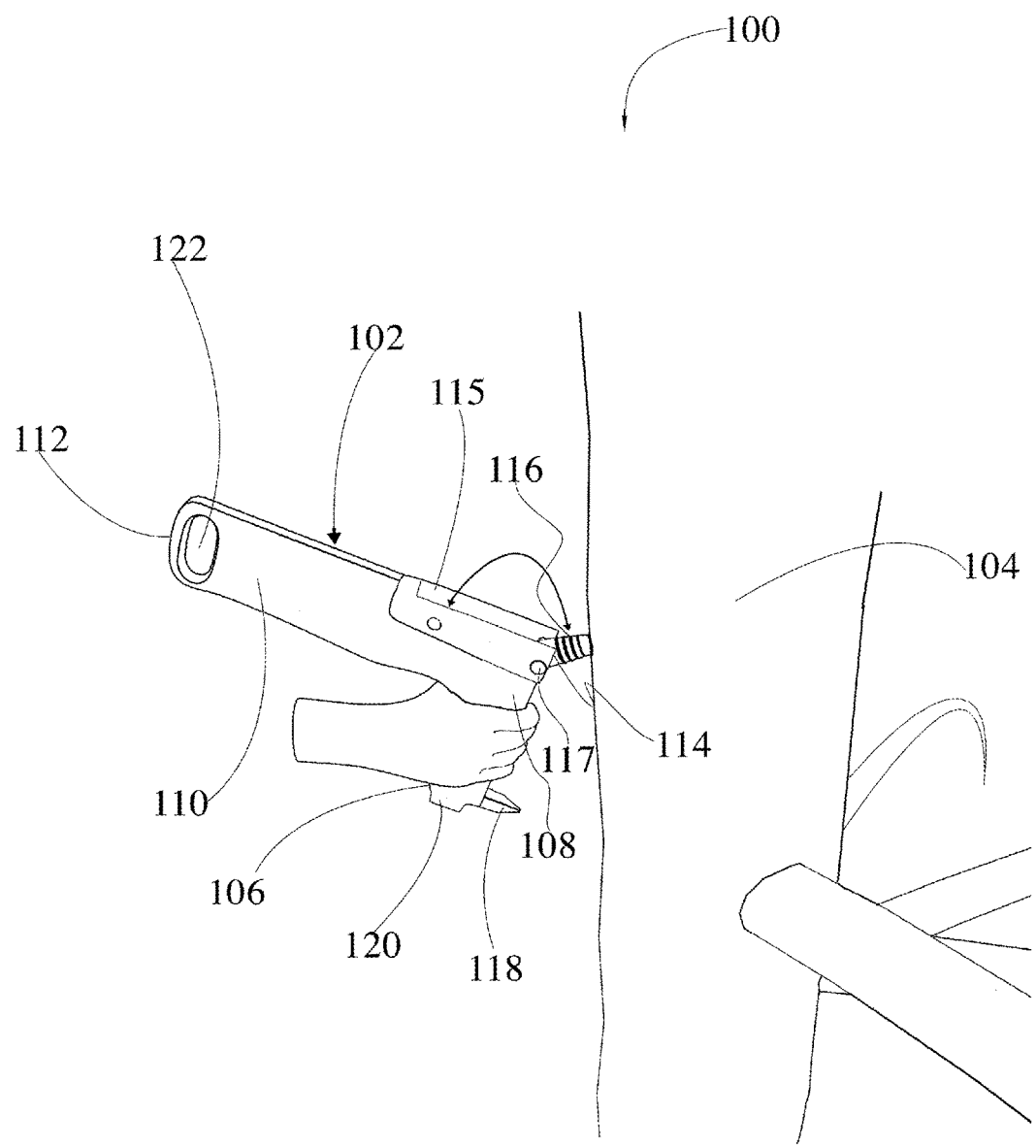
FIG. 2 is a top perspective view of the solo hunter system of FIG. 1, according to an embodiment of the present disclosure.

FIG. 2 shows a top perspective view of the solo hunter system 100 of FIG. 1, according to an embodiment of the present disclosure. As above, the solo hunter system 100 may include a horizontal angle member 110 that includes an anchor storage bed 115 extending from the right angle vertex 114 that may be able to receive the threaded anchor 116 in a stowed position when not in use and may also include (but not illustrated), a retention device such as for example a clevis pin or detent mechanism. The anchor storage bed 115 may further include at least a one hundred eighty degree pivot 117 coupling at the right angle vertex 114 for pivoting the threaded anchor 116 thereabout. As such the pivot 117 coupling may be configured to enable the threaded anchor 116 to rotate from a stowed position to a deployed position and back to the stowed position, as desired.

A stabilizing spike 118 located at the first end 106 of the vertical angle member 108 extending opposite of the horizontal angle member 110 extends at least one half inch in length. In one embodiment of the solo hunter system 100 the stabilizing spike 118 may be threaded into at the first end 106 of the vertical angle member 108 and further may be adjustable in length when desirable to overcome variations of surface textures of the vertical-object 104 that may for example comprise a tree having a course bark, or a phone pole having a smoother surface. In this way the present invention is versatile in use.

As shown in one embodiment of the solo hunter system 100 the right angle support member 102 may be configured forming the substantially L-shape that comprises the vertical angle member 108 and the horizontal angle member 110 on a common plane.

In continuing with FIG. 2 the right angle support member 102 may be able to rotate about the pivot 117 of the threaded anchor 116 and the right angle support member 102 may be used as a lever to substantially increase rotational torque while using the threaded anchor 116 as a fulcrum during the process of affixing the right angle support member 102 to a vertical-object 104 of choice.

Figure 3:
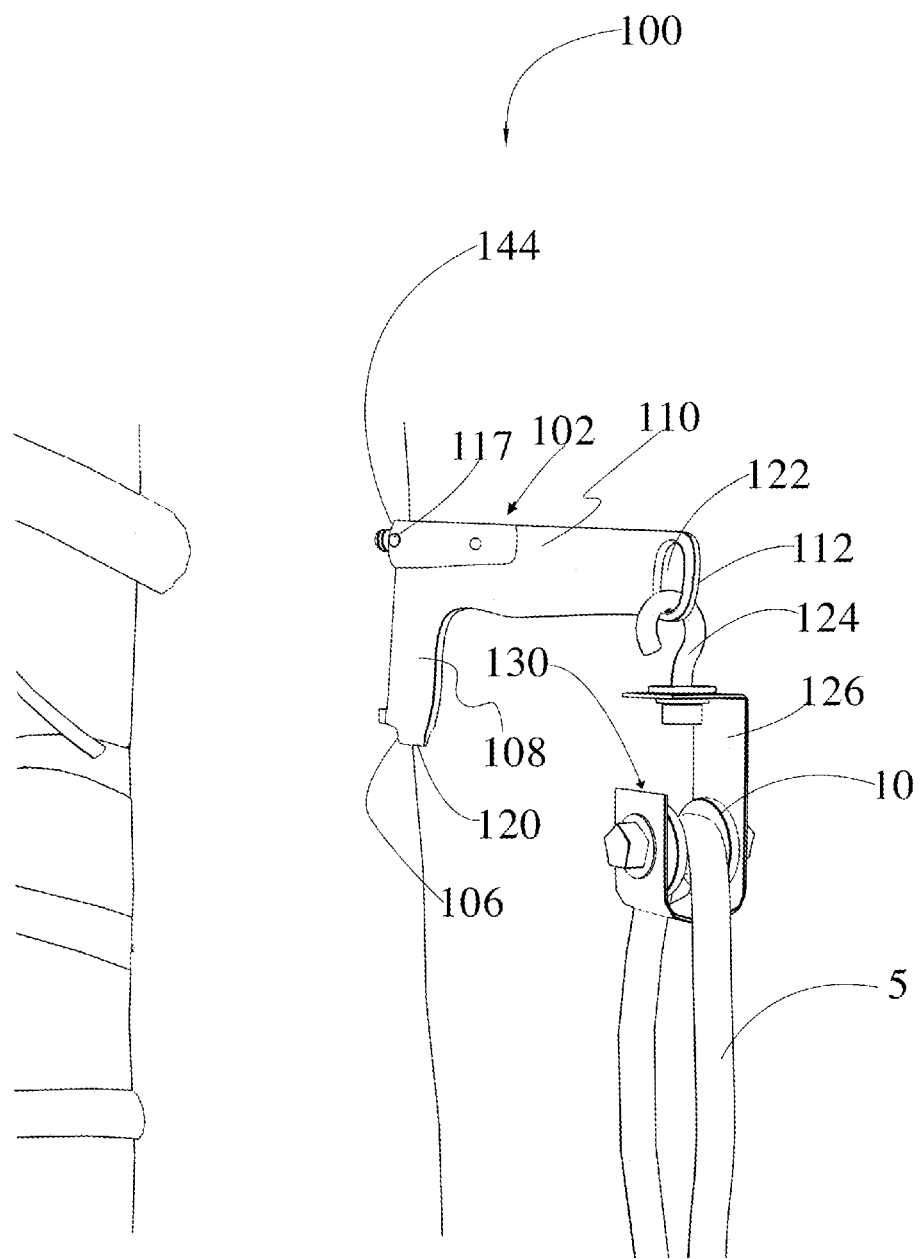
FIG. 3 is a front perspective view of the solo hunter system of FIG. 1, according to an embodiment of the present disclosure.

FIG. 3 shows a front perspective view of the solo hunter system 100 of FIG. 1, according to an embodiment of the present disclosure. As above, the solo hunter system 100 may include a pulley 10 system including a hook 124 and may be detachable from the hanger loop 122. Further the pulley 10 system may include a pulley cage 126 rotationally affixed to the hook 124; wherein the pulley cage 126 has a side opening 130 for lift line 5 engagement. The pulley 10 system may also include a block and tackle pulley 10 system in other embodiments. Embodiments of the present invention may further include a chopping tab 120 that is integral to the first end 106 of the vertical angle member 108 useful for debarking and the removal of small branches prior to affixing the solo hunter system 100 to a vertical-object 104 such as a tree.

Figure 4:
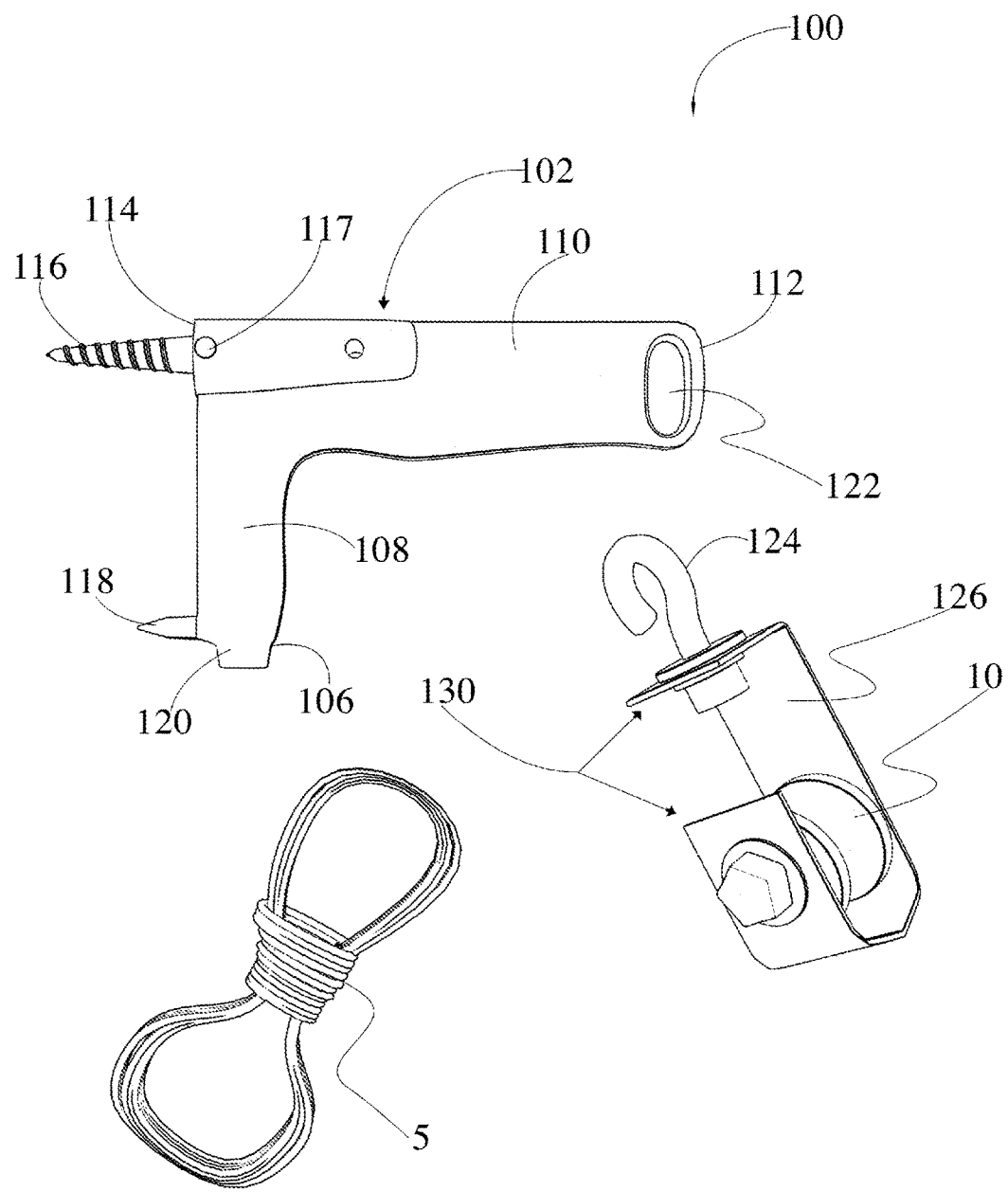
FIG. 4 is a side perspective view of the solo hunter system of FIG. 1, according to an embodiment of the present disclosure.

FIG. 4 shows a side perspective view of the solo hunter system 100 of FIG. 1, according to an embodiment of the present disclosure. As above, the solo hunter system 100 may include a right angle support member 102 that may be constructed of a metal alloy material having a tensile strength and thickness that may be substantially greater than a lifting force generated by the pulley 10 system when lifting at least two hundred and fifty pounds such that the right angle support member 102 does not substantially deform during use.

According to another embodiment of the present disclosure the right angle support member 102 may be constructed of a light weight metal alloy and/or composite material having a tensile strength and thickness that may be substantially greater than a lifting force generated by the pulley 10 system when lifting smaller game animals, hunting implements and accessories weighing less than two hundred and fifty pounds such that the right angle support member 102 does not substantially deform during use.

As above shown in FIG. 4 the pulley 10 system may include a pulley cage 126 rotationally affixed to the hook 124 and the pulley cage 126 has a side opening 130 for lift line 5 engagement. Upon reading this specification, it should be appreciated that, under appropriate circumstances, considering such issues as user preferences, design preference, structural requirements, marketing preferences, cost, available materials, technological advances, etc., other hanging means used with pulley 10 arrangements and leveraging means such as, for example, a block and tackle, rope, cable, strap, chain etc., may be sufficient.

Figure 5:
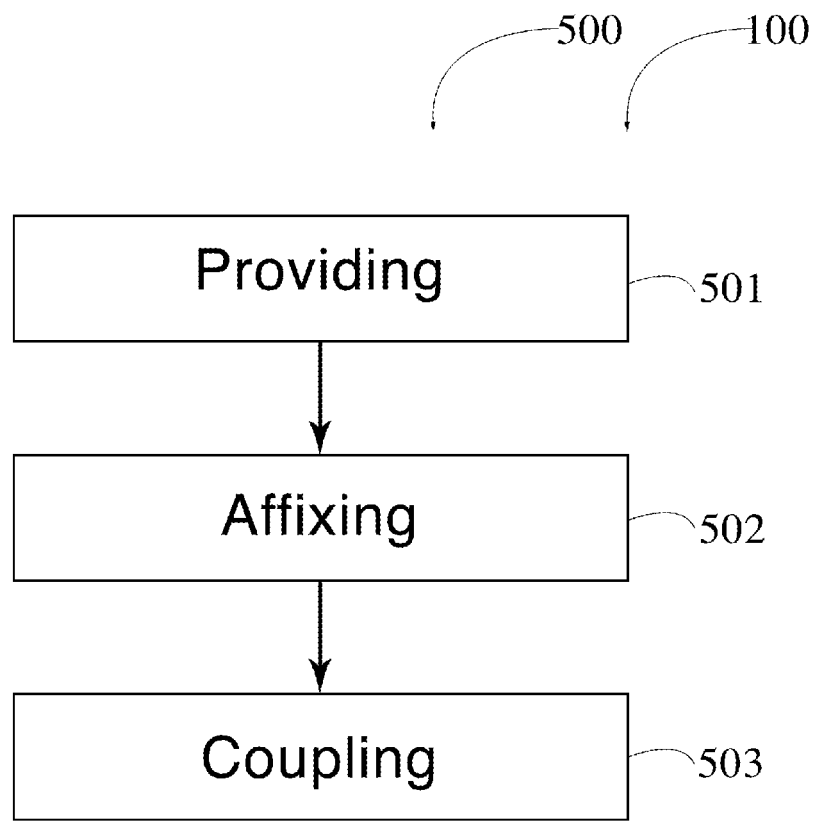
FIG. 5 is a flow diagram illustrating a method of use for the solo hunter system, according to an embodiment of the present disclosure.

Referring now to FIG. 5 showing a flow diagram 550 illustrating a method of use 500 for a solo hunter system 100 according to an embodiment of the present disclosure. As illustrated, the method of use 500 for a solo hunter system 100, preferably comprises the steps of: step one 501, providing a right angle support member 102 configured to be affixable to a vertical-object 104; the right angle support member 102 configured to form a substantially L-shape preferably having a vertical angle member 108 including a first end 106; a horizontal angle member 110 including a second end 112 configured to extend outwardly away from a right angle vertex 114; and a threaded anchor 116 hingebly coupled to the right angle vertex 114 configured to be affixable to the vertical-object 104; a stabilizing spike 118 located at the first end 106 of the vertical angle member 108 extending opposite of the horizontal angle member 110; a hanger loop 122 proximate the second end 112 of the horizontal angle member 110, the hanger loop 122 configured to receive and interact with a pulley 10 system; step two 502, affixing the right angle support member 102 to the vertical-object 104 by screw-fastening the threaded anchor 116 into the vertical-object 104 and the vertical angle member 108 being positioned against and substantially parallel to the vertical-object 104 such that the stabilizing spike 118 impales the vertical-object 104 at a point vertically below the threaded anchor 116 with the horizontal angle member 110 extending outwardly from the vertical-object 104 to support the hanger loop 122 at a distance away from the vertical-object 104 to receive the pulley 10 system in functional combination to thus provide an elevated lifting system; and step three 503, coupling the pulley 10 system for elevating liftable-objects (liftable-objects may comprise game and alternately hunting accessories desired to be lifted and lowered in relation to the vertical-object from a ground surface).

It should be noted that step 503 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for using the solo hunter system 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letter Patent is set forth in the appended claims:

1. A solo hunter system, the system comprising:
   a right angle support member configured to be affixable to a vertical-object;
   said right angle support member configured to form a substantially L-shape having;
   a vertical angle member having a first end;
   a horizontal angle member having a second end configured to extend outwardly away from a right angle vertex; and
   a threaded anchor hingebly coupled to said right angle vertex configured to be affixable to said vertical-object;
   a stabilizing spike located at said first end of said vertical angle member extending opposite of said horizontal angle member;
   a hanger loop proximate said second end of said horizontal angle member, said hanger loop configured to receive and interact with a pulley system; and
   wherein the right angle support member is configured to be affixable to said vertical-object by screw-fastening said threaded anchor into said vertical-object and said vertical angle member being positioned against and substantially parallel to said vertical-object such that said stabilizing spike impales said vertical-object at a point vertically below said threaded anchor with said horizontal angle member extending outwardly from said vertical-object to support said hanger loop at a distance away from said vertical-object to receive said pulley system in functional combination to thus provide an elevated lifting system.

2. The solo hunter system of claim 1, wherein said horizontal angle includes an anchor storage bed extending from said right angle vertex that is able to receive said threaded anchor in a stowed position when not in use.

3. The solo hunter system of claim 2, wherein said anchor storage bed further includes at least a one hundred eighty degree pivot coupling at said right angle vertex for pivoting said threaded anchor there-about.

4. The solo hunter system of claim 3, wherein said pivot coupling is configured to enable said threaded anchor to rotate from a stowed position to a deployed position and back to said stowed position, as desired.

5. The solo hunter system of claim 1, wherein said right angle support member is constructed of a metal alloy material, having a tensile strength and thickness that is substantially greater than a lifting force generated by said pulley system when lifting at least two hundred and fifty pounds such that said right angle support member does not substantially deform during use.

6. The solo hunter system of claim 1, wherein the right angle support member is constructed of a light weight metal alloy and composite material, having a tensile strength and thickness that is substantially greater than a lifting force generated by said pulley system when lifting less than one hundred pounds such that said right angle support member does not substantially deform during use.

7. The solo hunter system of claim 1, wherein the stabilizing spike extends at least one half inch in length.

8. The solo hunter system of claim 7, wherein the pulley system includes a hook and is detachable from said hanger loop.

9. The solo hunter system of claim 8, wherein the pulley system includes a pulley cage rotationally affixed to said hook.

10. The solo hunter system of claim 9, wherein the pulley cage has a side opening for lift line engagement.

11. The solo hunter system of claim 1, wherein the pulley system includes a block and tackle pulley.

12. The solo hunter system of claim 1, wherein the vertical-object comprises a tree.

13. The solo hunter system of claim 1, wherein the said right angle support member forming said substantially L-shape comprises said vertical angle member and said horizontal angle member on a common plane.

14. The solo hunter system of claim 1, wherein the right angle support member is able to rotate about said pivot of said threaded anchor.

15. The solo hunter system of claim 1, wherein the right angle support member comprises a lever using said threaded anchor as a fulcrum.

16. The solo hunter system of claim 1, wherein the right angle support member serves to function as a handle for screw-engaging said threaded anchor into said vertical-object to mount said right angle support member thereto for use, said right angle support member being substantially perpendicular to said vertical-object when installed.

17. A solo hunter system, the system comprising:
a right angle support member configured to be affixable to a vertical-object;
said right angle support member configured to form a substantially L-shape having;
a vertical angle member having a first end;
a horizontal angle member having a second end configured to extend outwardly away from a right angle vertex; and
a threaded anchor hingebly coupled to said right angle vertex configured to be affixable to said vertical-object;
a stabilizing spike located at said first end of said vertical angle member extending opposite of said horizontal angle member;
a hanger loop proximate said second end of said horizontal angle member, said hanger loop configured to receive and interact with a pulley system;
wherein the right angle support member is configured to be affixable to said vertical-object by screw-fastening said threaded anchor into said vertical-object and said vertical angle member being positioned against and substantially parallel to said vertical-object such that said stabilizing spike impales said vertical-object at a point vertically below said threaded anchor with said horizontal angle member extending outwardly from said vertical-object to support said hanger loop at a distance away from said vertical-object to receive said pulley system in functional combination to thus provide an elevated lifting system;
wherein said horizontal angle includes an anchor storage bed extending from said right angle vertex that is able to receive said threaded anchor in a stowed position when not in use;
wherein said anchor storage bed further includes at least a one hundred eighty degree pivot coupling at said right angle vertex for pivoting said threaded anchor there-about;
wherein said pivot coupling is configured to enable said threaded anchor to rotate from a stowed position to a deployed position and back to said stowed position, as desired;
wherein the stabilizing spike extends least one half inch in length;
wherein the right angle support member is able to rotate about said pivot of said threaded anchor;
wherein the right angle support member serves to function as a handle for screw-engaging said threaded anchor into said vertical-object to mount said right angle support member thereto for use, said right angle support member being substantially perpendicular to said vertical-object when installed; and
wherein the vertical-object comprises a tree.

18. The solo hunter system, of claim 17, further comprising set of instructions; and
wherein the solo hunter system, is arranged as a kit.

19. A method of use for a solo hunter system, the method comprising the steps of:
providing a right angle support member configured to be affixable to a vertical-object; said right angle support member configured to form a substantially L-shape having a vertical angle member having a first end; a horizontal angle member having a second end configured to extend outwardly away from a right angle vertex; and a threaded anchor hingebly coupled to said right angle vertex configured to be affixable to said vertical-object; a stabilizing spike located at said first end of said vertical angle member extending opposite of said horizontal angle member; a hanger loop proximate said second end of said horizontal angle member, said hanger loop configured to receive and interact with a pulley system;
affixing the right angle support member to said vertical-object by screw-fastening said threaded anchor into said vertical-object and said vertical angle member being positioned against and substantially parallel to said vertical-object such that said stabilizing spike impales said vertical-object at a point vertically below said threaded anchor with said horizontal angle member extending outwardly from said vertical-object to support said hanger loop at a distance away from said vertical-object to receive said pulley system in functional combination to thus provide an elevated lifting system; and
coupling said pulley system for elevating liftable-objects.

20. The method of claim 19, wherein said liftable-objects comprises game and alternately hunting accessories desired to be lifted and lowered in relation to said vertical-object from a ground surface.

\* \* \* \* \*